Jan. 10, 1939.   G. A. JOHNSON   2,143,154
COMBINED SPRING AND FRICTION SHOCK ABSORBERS
Filed Nov. 30, 1936   3 Sheets-Sheet 2

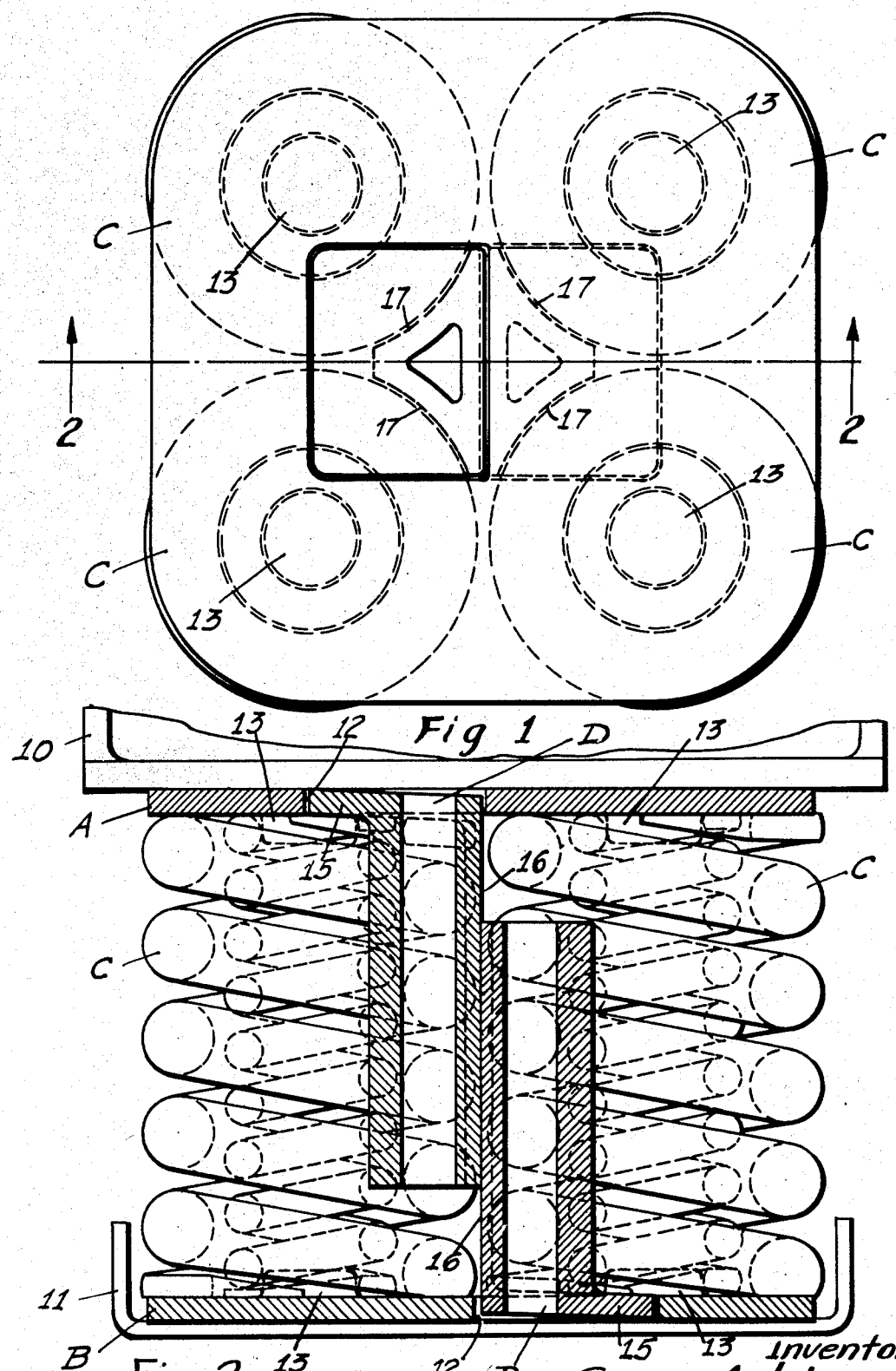

Inventor
George A. Johnson
By Henry Fuchs
Atty

Inventor
George A. Johnson
By Henry Fuchs
Atty

Patented Jan. 10, 1939

2,143,154

UNITED STATES PATENT OFFICE 2,143,154

COMBINED SPRING AND FRICTION SHOCK ABSORBER

George A. Johnson, Chicago, Ill., assignor to W. H. Miner, Inc., Chicago, Ill., a corporation of Delaware Application November 30, 1936, Serial No. 113,352

12 Claims. (Cl. 267—9)

This invention relates to improvements in combined spring and friction shock absorbers, especially adapted for use in connection with railway car trucks.

One object of the invention is to provide a combined spring and friction shock absorber for railway car trucks including a cluster of springs together with simple and efficient friction means for dampening the action of the springs.

Another object of the invention is to provide a shock absorber comprising a standard truck spring cluster and friction snubbing means cooperating therewith, wherein the desired snubbing or dampening action is obtained in connection with the truck supporting springs without reduction in the number of spring units employed in the cluster or in the shock absorbing capacity of the cluster, thus providing the required spring cushioning action to properly cushion both the light and heavier shocks to which the car and lading are subjected in service and successfully dampen the spring action to reduce the vibrations or oscillations of the springs to a minimum.

A more specific object of the invention is to provide in combination with the usual four spring cluster of a truck spring arrangement of railway cars, friction means for snubbing the action of the springs, comprising relatively slidable friction elements held in frictional contact with each other by the expansive action of the truck spring members, and accommodated in the space existing between the units of the spring cluster.

Other objects of the invention will more clearly appear from the description and claims hereinafter following.

Figure 3:
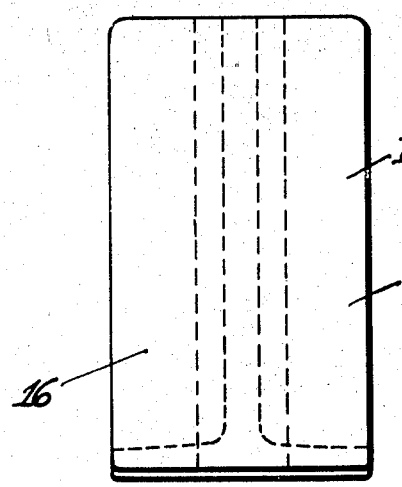
Figure 4:
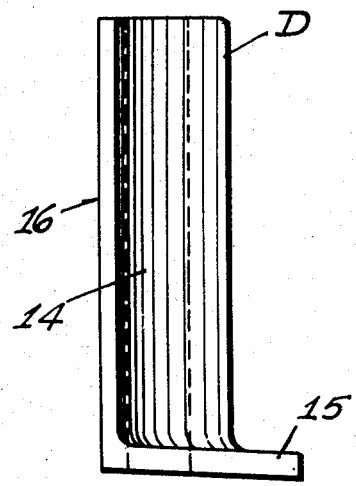
Figure 5:
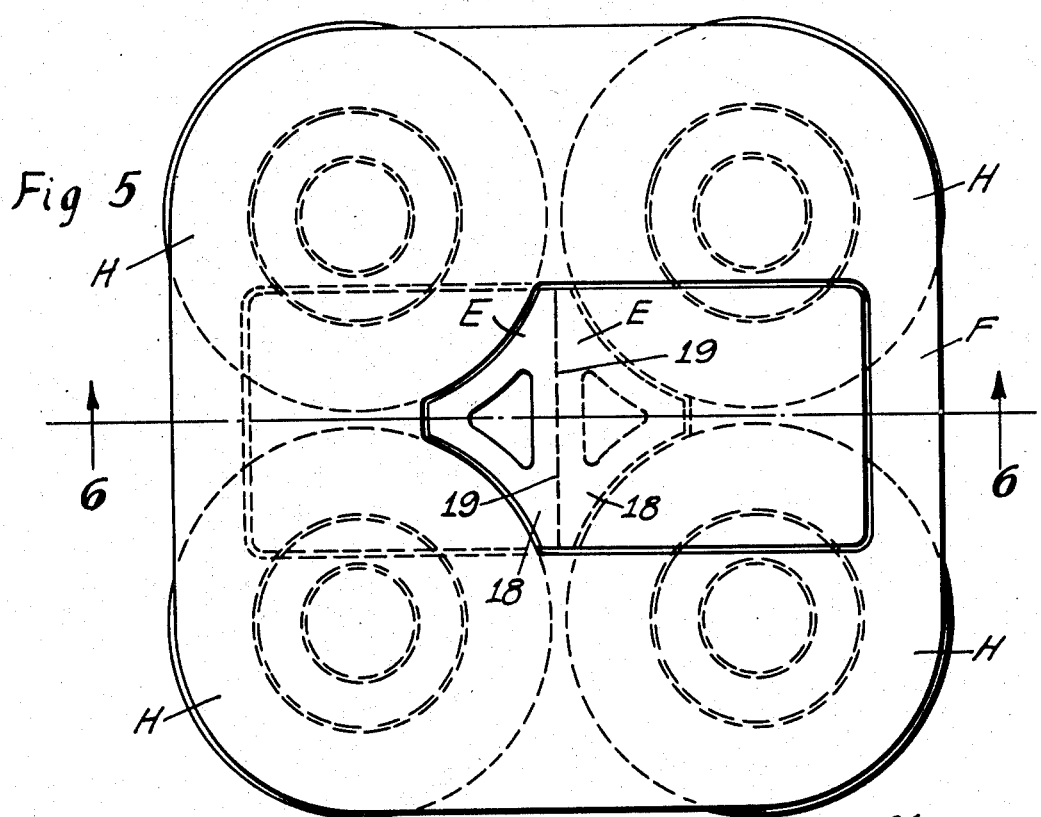
Figure 6:
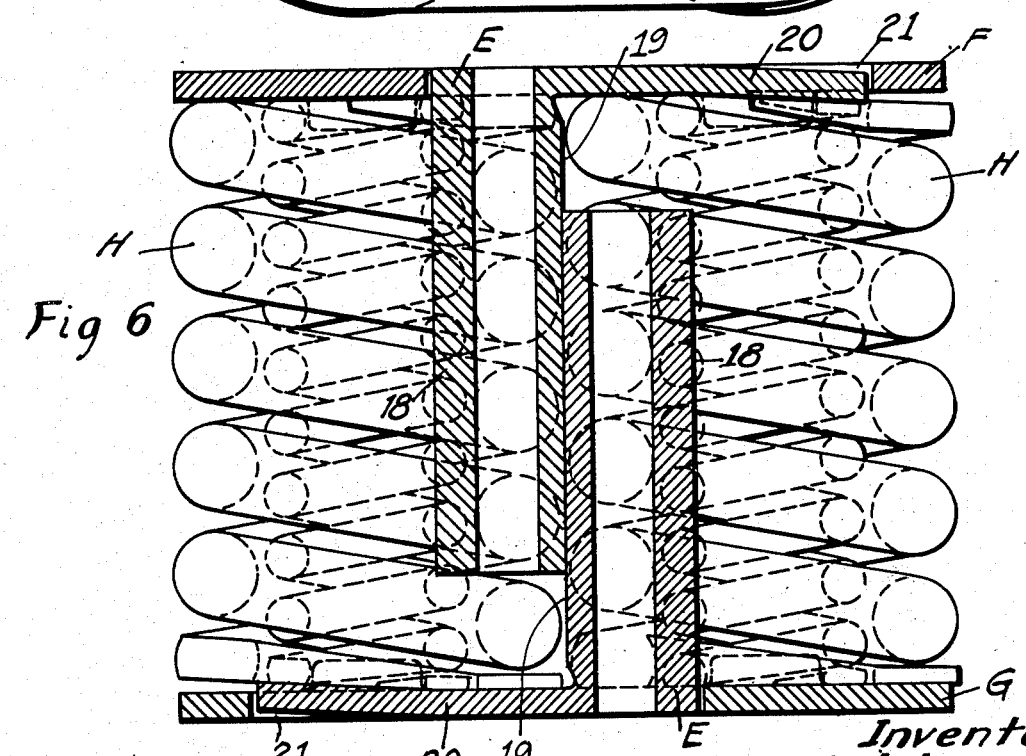

In the drawings forming a part of this specification, Figure 1 is a top plan view of my improved combined spring and friction shock absorber. Figure 2 is a vertical sectional view, corresponding substantially to the line 2—2 of Figure 1, showing the mechanism mounted between the bolster and spring plank of a railway car truck, the bolster and spring plank being illustrated broken away. Figures 3 and 4 are front and side elevational views, respectively, of one of the friction elements of the improved combined spring and friction snubber. Figures 5 and 6 are views, respectively similar to Figures 1 and 2, illustrating another embodiment of the invention.

In said drawings, referring more particularly to Figure 2, 10 indicates the truck bolster and 11 the spring plank of the truck of a railway car to which my improvements are applied, the improved combined spring and friction shock absorber being interposed between said truck bolster and spring plank.

Referring first to the embodiment of the invention illustrated in Figures 1 to 4 inclusive, my improved combined spring and friction shock absorber comprises broadly top and bottom spring plates A and B; four spring units C—C—C—C; and a pair of friction elements D—D.

The top and bottom spring plates A and B are of similar design, each being of substantially rectangular outline and having rounded corners, as shown most clearly in Figure 1. Each spring plate is provided with a substantially rectangular opening 12 therethrough, providing a seat adapted to accommodate the base portion of one of the friction elements D, as hereinafter more fully described. The openings 12—12 of the top and bottom spring plates are respectively located at opposite sides of a vertical plane coincident with the vertical central axis of the mechanism. Each plate is provided with the usual inwardly projecting spring centering bosses 13—13—13—13 indicated in dotted lines in Figures 1 and 2. These bosses are four in number and are spaced symmetrically about the central vertical axis of the mechanism. The spring plates A and B are exact duplicates, being reversely arranged so that the openings or seats 12—12 thereof are located at opposite sides of the vertical central axis of the mechanism.

The spring units C—C—C—C preferably correspond in size and capacity to the units of the usual truck spring cluster of a railway car truck and in actual practice the standard spring units of a four spring cluster are employed. Each spring unit C comprises a relatively heavy outer coil and a lighter inner coil, the coils being interposed between the spring plates A and B with the inner coil of the unit centered by the corresponding bosses 13—13 of the top and bottom plates A and B.

The friction elements D—D are of like design, each being in the form of a casting comprising a postlike plate member 14 having a laterally projecting base flange or foot 15 at one end thereof. On the inner side, the plate or post member 14 of each element D is provided with a relatively wide, flat friction surface 16. As will be seen upon reference to Figures 1, 2, and 4, the projecting base flange or foot member 15 extends from the side of the friction element opposite to the friction surface 16 thereof. The angle between the friction surface 16 and the bottom face of the foot member 15 is slightly in excess of a right angle, as clearly indicated in Figures 2, 3, and 4, whereby said foot member 15 is slightly inclined to the horizontal when the parts are assembled, thus providing for rocking lever action of the foot member on its support. The post or plate member 14 is cut away at opposite sides, as indicated at 17—17, to clear the corresponding pair of spring units C—C, as clearly shown in Figures 1 and 4, the cut away portions being provided with inwardly curved surfaces corresponding with the curvature of the outer coils of the spring units C—C. The posts or plate members of the friction elements D—D thus are broadly of substantially triangular, transverse cross sectional outline.

The two friction elements D—D of the shock absorber have the friction surfaces 16—16 thereof in flat engagement and said elements are reversely arranged end for end, that is, with the base flange or foot member 15 of one of the elements D at the bottom of the mechanism and the base flange or foot member 15 of the other element D at the top of the mechanism. The base members 15—15 are respectively seated in the openings 12—12 of the top and bottom spring plates A and B. The shape of the base flanges 15—15 is such as to fit the openings 12—12 of the plates A and B, that is, they are of square outline to seat in said openings, but sufficient clearance is provided between each base member and the side and end walls of the seat to allow the base member to have relatively free rocking movement within the seat. The springs C—C—C—C overlap the base members 15—15, one pair of springs C—C overlapping the base member 15 of one of said friction elements and the other pair of springs C—C of the cluster overlapping the base member 15 of the cooperating friction element. As will be evident, the base members of the friction elements D—D are thus subjected to the pressure of the springs and the tendency is to rock the friction elements toward each other to press the friction surfaces thereof into tight frictional engagement.

The top and bottom spring plates A and B bear respectively on the underneath surface of the truck bolster 10 and the top of the spring plank 11. The base portions 15—15 of the friction elements D—D engage through the openings 12—12 of the spring plates A and B and bear respectively on said bolster and spring plank. The friction elements D—D are thus held in tight frictional engagement with each other by the springs C—C due to the leverage action of the base members 15—15 which have rocking engagement at their outer ends with the cooperating faces of the truck bolster and spring plank. The post or plate member 14 of each friction element D is of lesser height than the distance between the spring plates A and B at the time that the springs C—C—C—C are in the expanded position shown in Figure 2. The upper end of the lower friction element D and the lower end of the upper friction element D are thus normally spaced from the inner sides of the top and bottom spring plates A and B, respectively. The clearance thus provided is sufficient to permit of the required compression of the springs C—C—C—C in service. Engagement of the ends of the friction members D—D with the respective plates serves to limit compression of the mechanism and prevents the springs from being unduly compressed.

The operation of my improved mechanism shown in Figures 1 to 4 inclusive is as follows:

Upon relative approach of the spring plank and truck bolster, the coils of the group or cluster of springs C—C—C—C are compressed between the plates A and B. At the same time, the friction elements D—D are forced to slide relatively lengthwise on each other, being actuated respectively by the spring plank and bolster. A friction snubbing action is thus produced during compression of the springs. During recoil of the springs, the friction elements are returned to the normal position shown in Figure 2, the base members 15—15 of the friction elements being moved outwardly away from each other with the spring plates by the recoil of the springs. The recoiling action of the springs is dampened or snubbed by the friction elements D—D which are held in tight frictional engagement through the spring pressure acting on the rocking arm or base portions of the friction elements. As will be evident, as the springs are being compressed the frictional resistance produced by the relative movement of the elements D—D is augmented due to the increased pressure of the springs on the arms or base portions 15—15. As the springs recoil, the frictional resistance is progressively reduced due to the reduction of the spring pressure on the rocking friction elements.

Referring next to the embodiment of the invention illustrated in Figures 5 and 6, the improved combined spring and friction shock absorber is similar to the design described in connection with Figures 1 to 4 inclusive with the exception that the friction elements thereof are of different design and the spring plates are accordingly modified to properly cooperate with these friction elements. The friction elements, which are indicated by E—E in Figures 5 and 6, have vertically disposed, platelike post portions 18—18 in sliding frictional engagement with each other, each post being of substantially the same transverse cross section as the post of the friction element D hereinbefore described and having a flat friction surface 19 in sliding frictional engagement with the corresponding friction surface of the cooperating element E. Each friction element has a laterally projecting base flange or foot portion 20 at one end thereof. The flanges 20—20 of the two friction elements E—E are adapted to engage the bolster and spring plank of the truck of the car, respectively, and have their outer end sections inclined, respectively, away from the bolster and spring plank, as shown in Figure 6, to provide for rocking action of the friction elements in a manner similar to the elements D—D, hereinbefore described.

The flange 20 of each friction element E projects from the friction surface side thereof and extends beyond the cooperating friction element, thereby forming a stop member or abutment adapted to be engaged by said cooperating friction element to limit compression of the mechanism.

The top and bottom spring plates, which are indicated by F and G in Figures 5 and 6, are similar to the plates A and B, hereinbefore described, with the exception that the openings thereof, which are indicated by 21—21, are of greater length than the openings 12—12 of the plates A and B and extend inwardly beyond the centers of the plates to accommodate the bases of the post portions of the friction elements E—E.

The springs which are indicated by H—H—H—H are similar in every respect to the springs C—C—C—C, hereinbefore described, and in actual practice standard truck springs are employed.

The operation of the mechanism disclosed in Figures 5 and 6 is the same as the operation of the mechanism disclosed in Figures 1 to 4 inclusive with the exception that the friction elements E—E rock on the inner sections of the base portions, instead of on the outer end edges of said base portions as is the case with the friction elements D—D.

I have herein shown and described what I now consider the preferred manner of carrying out my invention, but the same is merely illustrative and I contemplate all changes and modifications that come within the scope of the claims appended hereto.

I claim:

1. In a shock absorber, the combination with a pair of relatively movable friction elements in lengthwise sliding frictional contact with each other and interposed between a pair of relatively movable members, said elements having base portions in rocking engagement respectively with said members to mount each of said elements for rocking movement toward the other; of spring means interposed between said members and having bearing engagement with said base portions of said elements respectively for rocking both of said elements and pressing the latter into tight frictional contact.

2. In a shock absorber interposed between two relatively movable members to yieldingly resist relative approach thereof, the combination with opposed spring plates bearing on said members respectively; of a pair of friction elements in lengthwise sliding engagement with each other, each element having a rocker base portion integral therewith, said base portions extending through said plates respectively and having rocking engagement with said members; and springs interposed between and engaging said spring plates and overlapping said base portions of the friction elements to rock the latter into tight frictional engagement with each other.

3. In a shock absorber interposed between two relatively movable members to yieldingly resist relative approach thereof, the combination with opposed, relatively longitudinally movable friction elements in sliding contact with each other and having laterally projecting base flanges integral therewith and in rocking engagement with said members respectively to mount each of said elements for rocking movement toward the other; of two sets of springs interposed between said members for opposing relative approach thereof, one of said sets of springs bearing on the flange of one of said elements, and the other set of springs bearing on the flange of the other of said elements for pressing said elements into tight frictional engagement.

4. In a shock absorber interposed between two relatively movable members to yieldingly resist relative approach thereof, the combination with opposed, interengaging, relatively lengthwise slidable friction elements having laterally projecting base flanges rigid therewith, the base flange of one of said elements having pivotal engagement at its outer end on one of said members and the base flange of the other element having pivotal engagement at its outer end on the other member; of springs interposed between said members and bearing on said base flanges of said elements for rocking the latter into tight frictional engagement.

5. In a shock absorber interposed between two relatively movable members to yieldingly resist relative approach thereof, the combination with opposed, interengaging, relatively slidable friction elements, each having a laterally projecting base flange integral therewith, the base flange of one of said elements having pivotal engagement between its ends on one of said members, and the base flange of the other element having pivotal engagement between its ends on the other member; of spring means interposed between said members and bearing on said base flanges of said elements for rocking the same into tight frictional contact.

6. In a shock absorber interposed between two relatively movable members to yieldingly resist relative approach thereof, the combination with opposed friction elements having longitudinally disposed, engaging friction surfaces on the inner sides thereof in lengthwise sliding engagement with each other; of a base flange on each element at the outer side thereof, the base flange of one of said elements having rocking engagement with one of said members, and the base flange of the other element having rocking engagement with the other member; and springs interposed between said members and pressing on said base flanges for rocking said elements toward each other.

7. In a shock absorber interposed between two relatively movable members to yieldingly resist relative approach thereof, the combination with opposed friction elements having longitudinally disposed, engaging friction surfaces on the inner sides thereof; of a base flange on each element on the friction surface side thereof and projecting laterally outwardly therefrom, the base flanges of said elements having rocking bearing engagement respectively with said members; and springs interposed between said members and pressing on said base flanges for rocking said elements into tight frictional contact with each other.

8. In a shock absorber interposed between two relatively movable members to yieldingly resist relative approach thereof, the combination with longitudinally, relatively movable friction elements having base flanges disposed at opposite ends of the device and respectively in rocking engagement with said members; of a spring plate abutting each member and having an opening therethrough freely accommodating the base flange of the corresponding element, springs bearing at opposite ends on said plates, part of said springs pressing on one of said base flanges and the remainder of said springs bearing on the other of said base flanges for rocking said elements toward each other into tight frictional contact.

9. In a spring device adapted to resist approach of two relatively movable members, the combination with a cluster of springs interposed between said members; of a pair of friction elements movable respectively with said members and having lengthwise sliding frictional engagement with each other, said friction elements being surrounded by said springs and each having a base flange, the flanges of said elements being respectively at opposite ends of the mechanism and engaged by said springs for pressing the friction elements into tight frictional engagement with each other.

10. In a spring device adapted to resist approach of two opposed relatively movable members, the combination with a pair of friction elements in lengthwise sliding frictional engagement with each other and movable respectively with said members, said elements having base flanges respectively in rocking engagement with said members; of a cluster of four springs arranged symmetrically about the central axis of the mechanism and surrounding said friction elements, one pair of said springs bearing on the base flange of one of said elements and the other pair of springs bearing on the base flange of the other element for rocking said elements into tight frictional engagement with each other 11. In a railway car truck including relatively movable truck bolster and spring plank members, the combination with a cluster of four springs yieldingly supporting the bolster on the spring plank; of relatively movable friction elements having lengthwise sliding frictional engagement with each other and rocking engagement respectively with said bolster and spring plank, said springs operatively engaging said elements to rock the same toward each other into tight frictional contact.

12. In a railway car truck including relatively movable truck bolster and spring plank members, the combination with top and bottom friction elements having longitudinal, sliding, frictional engagement with each other, said top element having a base flange at the upper end thereof rigid therewith and in rocking engagement with the bolster, said bottom friction element having a base flange at the lower end thereof rigid therewith and in rocking engagement with the spring plank; a cluster of four springs surrounding said friction elements, said springs yieldingly supporting the bolster on the spring plank, one pair of said springs pressing on the base flange of the top element and the other pair of springs pressing on the base flange of the bottom element for rocking said elements into tight frictional engagement with each other.

GEORGE A. JOHNSON.